US012774677B2

(12) United States Patent
Deng

(10) Patent No.: US 12,774,677 B2
(45) Date of Patent: Oct. 27, 2026

(54) GAS TURBINE PEAKING POWER PLANT WITH $CO_2$ CAPTURE

(71) Applicant: Mitsubishi Power Americas, Inc., Lake Mary, FL (US)

(72) Inventor: Shimin Deng, Oakville (CA)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 0 days.

(21) Appl. No.: 18/757,485

(22) Filed: Jun. 27, 2024

(65) Prior Publication Data

US 2026/0002467 A1 Jan. 1, 2026

(51) Int. Cl.
*F02C 3/30* (2006.01)
*F01K 23/10* (2006.01)
*F02C 6/08* (2006.01)

(52) U.S. Cl.
CPC ................ *F02C 3/30* (2013.01); *F01K 23/10* (2013.01); *F02C 6/08* (2013.01); *F05D 2270/08* (2013.01); *F05D 2270/16* (2013.01); *Y02E 20/16* (2013.01)

(58) Field of Classification Search
CPC .................................... F02C 3/00; F02C 3/30
See application file for complete search history.

(56) References Cited

U.S. PATENT DOCUMENTS 4,477,419 A 10/1984 Pearce et al.
4,857,283 A 8/1989 Madden, II
2004/0128975 A1* 7/2004 Viteri ........................ F02C 6/10 60/39.55
2009/0301099 A1* 12/2009 Nigro ........................ F02C 3/30 60/39.52
2021/0262383 A1* 8/2021 Uechi ........................ F02C 6/04
2022/0136416 A1* 5/2022 Nagafuchi .............. F01K 17/06 60/772
2022/0397057 A1* 12/2022 Deng ...................... F01D 15/10

OTHER PUBLICATIONS

"Hot SCR Systems for Combustion Turbines in Simple Cycle", Mitsubishi Power Systems, 2013.

(Continued)

*Primary Examiner* — Katheryn A Malatek
(74) *Attorney, Agent, or Firm* — Schwegman Lundberg & Woessner, P.A.

(57) ABSTRACT

A power production facility comprises a gas turbine engine to combust fuel in a combustion process to produce exhaust gas to produce shaft power for generating electricity, a steam system to produce steam with heat from the exhaust gas for injection into the combustion process, and an emissions capture system to receive the exhaust gas to remove pollutants, receive steam from the steam system to provide heat to the emissions capture system, and provide water to the steam system. A method of removing emissions from a power plant comprises generating exhaust with a gas turbine engine, generating steam in a steam system from water with heat from the exhaust, injecting steam into a combustor of the gas turbine engine, heating an emissions capture unit with steam, removing emissions from the exhaust with the emissions capture unit, and collecting water from the emissions capture unit for providing to the steam supply.

11 Claims, 4 Drawing Sheets

(56) References Cited

OTHER PUBLICATIONS

Macchi, E, "A Cogeneration Plant Based on a Steam Injection Gas Turbine With Recovery of the Water Injected Design Criteria and Initial Operating Experience", The International Gas Turbine and Aeroengine Congress and Exposition, The Hague, Netherlands, 1994, 10 pgs.

Cheng, D, "The Distinction Between the Cheng and STIG Cycles", ASME Expo Barcelona, Span, May 2006, 17 pages.

Debiasi, V, "Combined cycle heat rates at simple cycle$ kW plant costs", Gas Turbine World, 2013, 22-29.

Jonsson, M, "Humidified Gas Turbines A Review of Proposed and Implemented Cycles", Energy vol. 30, Issue 7, Jun. 2005, pp. 1013-1078.

Schmitt, Tommy, et al. "(Part 1) Cost and Performance Baseline for Fossil Energy Plants vol. 1 Bituminous Coal and Natural Gas to Electricity", National Energy Technology Laboratory NETL, DOE NETL, 2023 4320, Oct. 2022, 432 pages.

Schmitt, Tommy, et al. "(Part 2) Cost and Performance Baseline for Fossil Energy Plants vol. 1 Bituminous Coal and Natural Gas to Electricity", National Energy Technology Laboratory NETL, DOE NETL, 2023 4320, Oct. 2022, 431 pages.

* cited by examiner

GAS TURBINE PEAKING POWER PLANT WITH $CO_2$ CAPTURE

TECHNICAL FIELD

This document pertains generally, but not by way of limitation, to gas turbine power plants used with steam systems. More specifically, but not by way of limitation, the present application relates to systems for reducing emissions in gas turbine power plants.

BACKGROUND

With renewable energy making up increasingly larger portions of energy production contributed to the grid, more and more power plants will likely need to feature peaking operation capabilities to handle surges in demand for electricity. For example, the intermittency of renewable energy, such as wind and solar, can cause gaps in power production from renewable energy sources that are made up with other power plant types not dependent on weather conditions, such as gas turbine power plants. Gas turbine combined cycle (GTCC) plants typically operate with a steam cycle, including a heat recovery steam generator (HRSG) and a steam turbine. However, the steam cycle can take a long period of time before coming to operating conditions suitable for operating the steam turbine. For example, steam turbines typically have a very large mass that can take a long time to heat-up to operating temperatures. A peaking power plant, also called a peaker, is typically a gas turbine in simple cycle (GTSC) that has fast-start capability. For example, a GTSC does not operate with a steam turbine and can thus come up to operational conditions relatively quickly. A simple cycle plant has operating flexibility that comes at a sacrifice in performance, such as output and heat rate, compared to a combined cycle plant, which has higher efficiency but less flexibility in satisfying the requirement of peaking operation, caused by aforementioned slow start of the steam turbine.

Emissions capture and removal systems can be used with gas turbine power plants to remove harmful material from the exhaust gas. For example, Hot Selective Catalytic Reduction (SCR) and carbon monoxide (CO) catalysts can be installed downstream of a gas turbine engine within the exhaust gas flow path for emission control. SCR catalysts can remove NOx emissions from the exhaust gas in conjunction with a reductant, such as ammonia or urea. CO catalysts can remove carbon monoxide emissions from the exhaust gas without a reactant. These NOx and CO catalysts typically operate efficiently at temperatures below that of typical turbine exhaust gas. In combined cycle power plants, the temperature of the exhaust gas is reduced with the HRSG before the exhaust gas interacts with the catalyst. However, in GTSC a dilution blower or fan is typically used to reduce exhaust gas temperature levels to those that are more conducive for chemical reactions. Installation of the dilution blower and associated ducts increases the cost of capital equipment and impacts performance due to the additional auxiliary load of supplying electrical power to the blower.

Overview

The present inventor has recognized, among other things, that problems to be solved in gas turbine power plants, such as peaking plants, can include 1) the penalties that are incurred when using NOx and CO catalysts and carbon dioxide ($CO_2$ or CO2) capture systems with a gas turbine power plant, and 2) the drawback of operating with steam injection.

In addition to removing CO and NOx from exhaust gas for the purposes of reducing pollution, it is desirable to remove CO2 from gas turbine exhaust gas. CO2 reduction is important in combating climate change. Installation of post-combustion capture equipment in GTCC power plants typically involves the removing CO2 from flue gas before the flue gas exits to atmosphere. CO2 capture can involve a chemical process using solvents such as MEA (monoethanolamine). Post-combustion capture of CO2 impacts efficiency of power plants because CO2 capture units typically require a large amount of heat for solvent regeneration in an MEA unit, which also results in large additional auxiliary loads being placed on the power plant. CO2 capture units also increase the capital equipment cost. Since peaking power plants are typically designed for operating flexibility, such as fast start-up, and lower capital equipment costs, CO2 capture is not typically used with GTSC (gas turbine simple cycle) power plants.

As such, in order to fully realize emissions reductions for NOx, CO and CO2 in GTSC power plants, there is typically an efficiency penalty including an electrical penalty for operating the dilution blower and heat/power penalties for operating the CO2 capture unit.

Gas turbine performance can be enhanced via the injection of steam into the combustion process, such as by increasing the mass of the high energy gas generated in the combustor to increase the capability of driving the gas turbine. GTSC power plants operating with steam injection have higher output and lower heat rate than conventional GTSC operating without steam injection. However, steam injection has the drawback of consuming large quantities of fresh water. This can limit the application of steam injection in regions where a large supply of fresh water is lacking.

The present subject matter can help provide solutions to these problems and other problems, such as by combining steam injection and an emissions capture system in a gas turbine power plant, particularly a peaking plant, in a mutually beneficial manner. For example, a CO2 capture system can use steam from a steam system to heat a solvent to remove CO2 from exhaust gas, and recovered/recycled water of the CO2 capture system can be used to inject steam into the combustion process of the gas turbine. Furthermore, the steam system used to generate the steam for the steam injection can eliminate the need for a dilution blower to operate NOx catalysts.

In a particular application, the present disclosure can improve the performance of peaking power plants by using steam-injection GTSC with post-combustion CO2 capture. The water vapor in flue gas of the GTSC power plant can be condensed and recovered from a flue gas cooler of the CO2 capture unit. The recovered water can be heated in a heat recovery steam generator (HRSG) to generate steam. High-pressure steam can be injected into the gas turbine engine combustor. Additionally, low-pressure steam produced in the HRSG can be used to apply heat to a CO2 capture unit.

The power plants of the present disclosure can achieve numerous benefits, including:

- Significant performance improvement in terms of output and heat rate of the peaker plant due to GTSC steam injection.
- CO2 is captured from the flue gas, which can reduce the environmental impact of the power plant and could greatly improve the economy of a project if carbon tax credit and other incentives, e.g., governmental economic incentives, are applied.
- Water recovered as a byproduct in the CO2 capture system due to fuel generated water vapor in the exhaust gas can be condensed in a flue gas cooler for other usage, such as water input to electrolyzer or cooling system makeup.

Dilution blowers for CO and NOx emissions catalysts used in conventional GTSC power plants can be avoided.

In an example, a power production facility can comprise a gas turbine engine configured to combust a fuel in a combustion process to produce exhaust gas that can be used to produce rotational shaft power for generating electricity, a steam system configured to produce steam from water with heat from the exhaust gas for injection into the combustion process, and an emissions capture system configured to receive the exhaust gas to remove pollutants, receive steam from the steam system to provide heat to the emissions capture system, and provide water to the steam system.

In another example, a method of removing emissions from a power plant can comprise generating an exhaust stream with a gas turbine engine, generating a steam supply in a steam system from a water supply with heat from the exhaust stream, injecting steam from the steam supply into a combustor of the gas turbine engine, heating an emissions capture unit with steam from the steam supply, removing emissions from the exhaust stream with the emissions capture unit, collecting water from the emissions capture unit, and providing the water from the emissions capture unit to the steam supply.

This overview is intended to provide an overview of subject matter of the present patent application. It is not intended to provide an exclusive or exhaustive explanation of the invention. The detailed description is included to provide further information about the present patent application.

Figure 1:
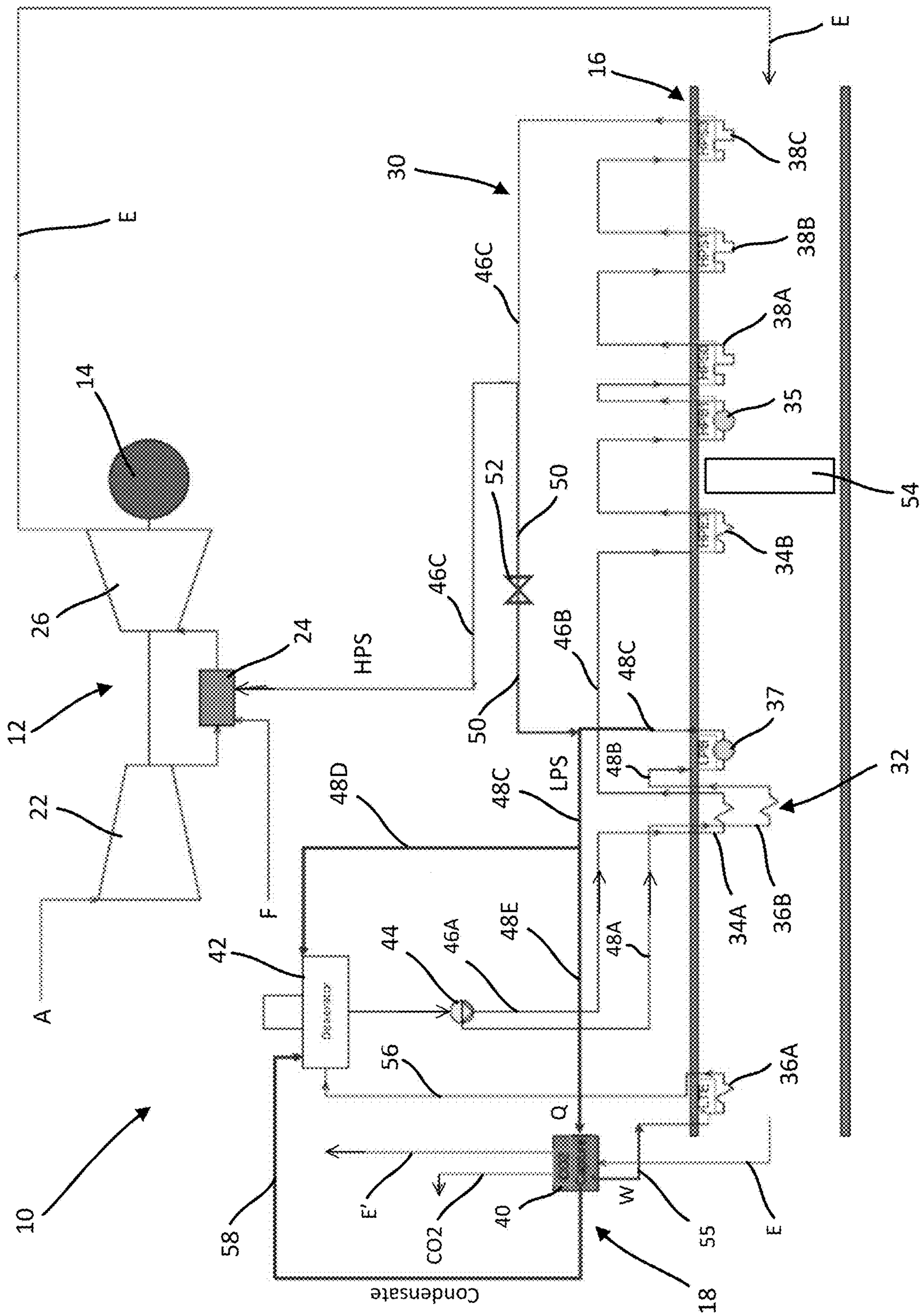
FIG. 1 is a schematic illustration of a gas turbine power plant comprising a gas turbine engine, a steam system and an emissions capture unit, wherein low-pressure steam from the steam system is used as a heating source for the emissions capture unit and high-pressure steam from the steam system is used for steam injection in the gas turbine engine.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram of power plant 10 including a gas turbine engine (GTE), e.g., GTE 12, electric generator 14, a heat recovery steam generator (HRSG), e.g., HRSG 16, and emissions capture system 18.

GTE 12 can include compressor 22, combustor 24 and turbine 26, which can operate with inputs of air A and fuel F to drive electric generator 14. Fuel F can also be heated before inputting to combustor 24. Output of electric generator 14 can be provided to an electrical grid to supply electricity to various commercial, residential and industrial consumers. GTE 12 can produce exhaust gas E as a result of combusting air A and fuel F. HRSG 16 can operate a steam cycle that utilizes exhaust gas E to heat water into steam.

With the present disclosure, steam from HRSG 16 can be used for steam injection into combustor 24 and for providing a heat input to emissions capture system 18, and water recovered from exhaust gas E in emissions capture system 18 can be used to replenish water in the steam system consumed by the steam injection.

HRSG 16 can comprise high-pressure circuit 30 and low-pressure circuit 32. High-pressure circuit 30 can comprise high-pressure economizers (HPE), such as HPE 34A and HPE 34B, and high-pressure evaporator 35. Low-pressure circuit 32 can comprise low-pressure economizers (LPE), such as LTE 36A and LPE 36B, and low-pressure evaporator 37. High-pressure circuit 30 can additionally include superheating stages (HPS), such as HPS 38A, HPS 38B and HPS 38C.

Emissions capture system 18 can comprise capture unit 40. HRSG 16 can further comprise deaerator 42 and pump 44. High-pressure circuit 30 can comprise first line 46A, second line 46B and third line 46C. Low-pressure circuit 32 can comprise first line 48A, second line 48B, third line 48C, fourth line 48D and fifth line 48E. HRSG 16 can additionally comprise letdown line 50 and letdown valve 52. Letdown line 50 and letdown valve 52 can be collectively referred to as a letdown station. Additionally, included within HRSG 16 can be catalyst 54.

Exhaust gas E can exit turbine 26, pass through HRSG 16, enter capture unit 40 and be released to atmosphere as exhaust gas E', with CO2 separated therefrom. Exhaust gas E leaving HRSG 16 can also be referred to as flue gas.

Catalyst 54 can comprise a selective catalytic reduction (SCR) system that can convert oxides of nitrogen (NOx) in the exhaust gas to nitrogen and water by a catalytic reaction of a mixture of the exhaust gas and a reducing agent or reductant, such as anhydrous ammonia, aqueous ammonia or urea. The exhaust gas and reductant mixture can react in presence of a catalyst disposed in a panel or bed positioned in the flow path of exhaust gas E. SCR system reactors are typically placed downstream of an exhaust duct of a combustion source, such as GTE 12, and utilize the catalyst and the reductant to convert NOx into diatomic nitrogen (N2) and water (H2O). In the illustrated example, catalyst 54 is shown positioned within HRSG 16. In examples, catalyst 54 is positioned within a temperature gradient of HRSG 16 to place catalyst 54 at a location where the temperature of exhaust gas E is suitable for carrying out the chemical reaction that occurs within the catalyst 54. As such, HRSG 16 can sufficiently reduce the temperature of exhaust gas E before interacting with catalyst 54, thereby eliminating the need for a dilution blower. For example, heat from exhaust gas E can be transferred to water within HRSG 16 to reduce the temperature of exhaust gas E. FIG. 1 illustrates a single instance of catalyst 54, but additional catalysts can be used.

Additionally, catalyst 54 can comprise a CO catalyst or a combination of an SCR catalyst and a CO catalyst.

Capture unit 40 can capture CO2 from exhaust gas E for sequestration or containment in a storage unit before exhaust gas E' is released to the atmosphere. In additional examples, the CO2 can be used for other purposes, such as in oil recovery processes. Capture unit 40 can operate with an input of heat Q (from low-pressure (LP) steam) provided by HRSG 16 and can output water W and condensate. Capture unit 40 as used in the power plants of the present disclosure can comprise CO2 capture units. As discussed in greater detail with reference to FIG. 2, capture unit 40 can comprise a MEA (monoethanolamine) chemical absorption unit. Capture unit 40 can, however, comprise other types of units that capture other types of materials using other types of chemical reactions.

Water can flow from capture unit 40 to LTE 36A through line 55 and then into deaerator 42 through line 56. Deaerator 42 can remove dissolved gases from the returned condensate in line 58 and recycled water W of line 55 of capture unit 40 before entering pump 44 and being returned to HRSG 16. For example, deaerator 42 can remove oxygen and carbon dioxide that can be corrosive to HRSG 16 and turbine 26. From pump 44, water can flow into low-pressure circuit 32 at LPE 36B through first line 48A and then into low-pressure evaporator 37 through second line 48B. Low-pressure evaporator 37 can convert or can assist in converting low-pressure water to low-pressure steam. From low-pressure evaporator 37, low-pressure steam can flow into third line 48C where low-pressure steam can be provided to capture unit 40 to provide heat input Q in fifth line 48E. The portion of low-pressure steam from third line 48C that passes through capture unit 40 in fifth line 48E can be returned to deaerator 42 as condensate through line 58. A portion of the low-pressure steam from third line 48C can flow directly to deaerator 42 in fourth line 48D for deaeration usage. All of the streams in line 56, line 58 and line 48D can be combined in deaerator 42 and recycled into HRSG 16 through pump 44 and water in first line 46A and first line 48A. The proportions of low-pressure steam that enter fourth line 48D and fifth line 48E can be configured in a plurality of ways, such as by being controlled by operation of capture unit 40 and deaerator 42. Typically, a majority of the low-pressure steam from third line 48C can be provided to capture unit 40. For example, capture unit 40 typically needs steam at a specific temperature and pressure and a valve can be used to direct left over steam, e.g., steam not needed by capture unit 40, to deaerator 42. The amount of steam consumed by capture unit 40 depends on how much CO2 is being captured. In other examples, fourth line 48D is to satisfy demand of deaerator operation, and low-pressure steam flow to capture unit 40 can be controlled in other ways, such as with letdown line 50.

Pump 44 can also provide water to high-pressure circuit 30 at first line 46A. Water can enter HPE 34A from first line 46A and can then flow into HPE 34B through second line 46B. From HPE 34B water can flow to high-pressure evaporator 35. High-pressure evaporator 35 can convert or can assist in converting high-pressure water to high-pressure steam. Thereafter, high-pressure steam can flow through HPS 38A, HPS 38B and HPS 38C for further heating (superheating). High-pressure steam can exit HRSG 16 at third line 46C and can be provided to combustor 24 by third line 46C.

In examples, power plant 10 can optionally include letdown line 50 and letdown valve 52. Letdown line 50 and letdown valve 52 can be included to allow a portion of high-pressure steam to be provided to capture unit 40 after being reduced in pressure. Letdown valve 52 can reduce pressure from high pressure to low pressure and, in examples, can comprise a pressure reducing valve. In examples, letdown valve 52 can additionally be used to introduce water, such as spray water from an external source, into the letdown valve leading into third line 48C to reduce the temperature of steam therein since capture unit 40 typically operates with steam at much lower temperatures than the temperatures at which steam injection is performed. Letdown valve 52 can be set at a fixed ratio or be controlled by an operator, or can vary depending on the operating state of HRSG 16 and other components. In examples, letdown valve 52 can be opened when it is desirable to reduce or shut-off flow of steam injection to combustor 24 and can be closed when it is desirable to reduce CO2 capture based on high-pressure steam. Note, CO2 capture can still operate with LP steam from LP circuit 32 even if letdown valve 52 is completely shut off. In examples, letdown line 50 and letdown valve 52 can be omitted such that all of the high-pressure steam of third line 46C is conveyed to combustor 24.

As described herein, power plant 10 can integrate, e.g., synergistically utilize cooperative functioning, of capture unit 40 and HRSG 16 to provide steam injection to GTE 12. Capture unit 40 can provide recycled/recovered water to HRSG 16 that would otherwise be discharged. Part of fuel generated steam contained in flue gas can also be recovered in capture unit 40 as water byproduct which can be utilized for other usages, such as input to electrolyzer or cooling system makeup. In addition to providing steam to GTE 12, HRSG 16 can provide heat Q to capture unit 40, which would otherwise need to be obtained from another source that might incur operating penalties. Furthermore, exhaust gas E provided to capture unit 40 can be tempered, e.g., reduced in temperature, by HRSG 16 to temperatures suitable for use with catalyst 54, thereby eliminating the need for a separate dilution blower that is typically used in conventional gas turbine simple cycle power plants having emissions capture catalysts. As such, the overall efficiency of power plant 10 is increased, as compared to other GTSC power plants that operate emissions capture units with, for example, a catalyst using a dilution blower that reduces the output of an electric generator.

Figure 2:
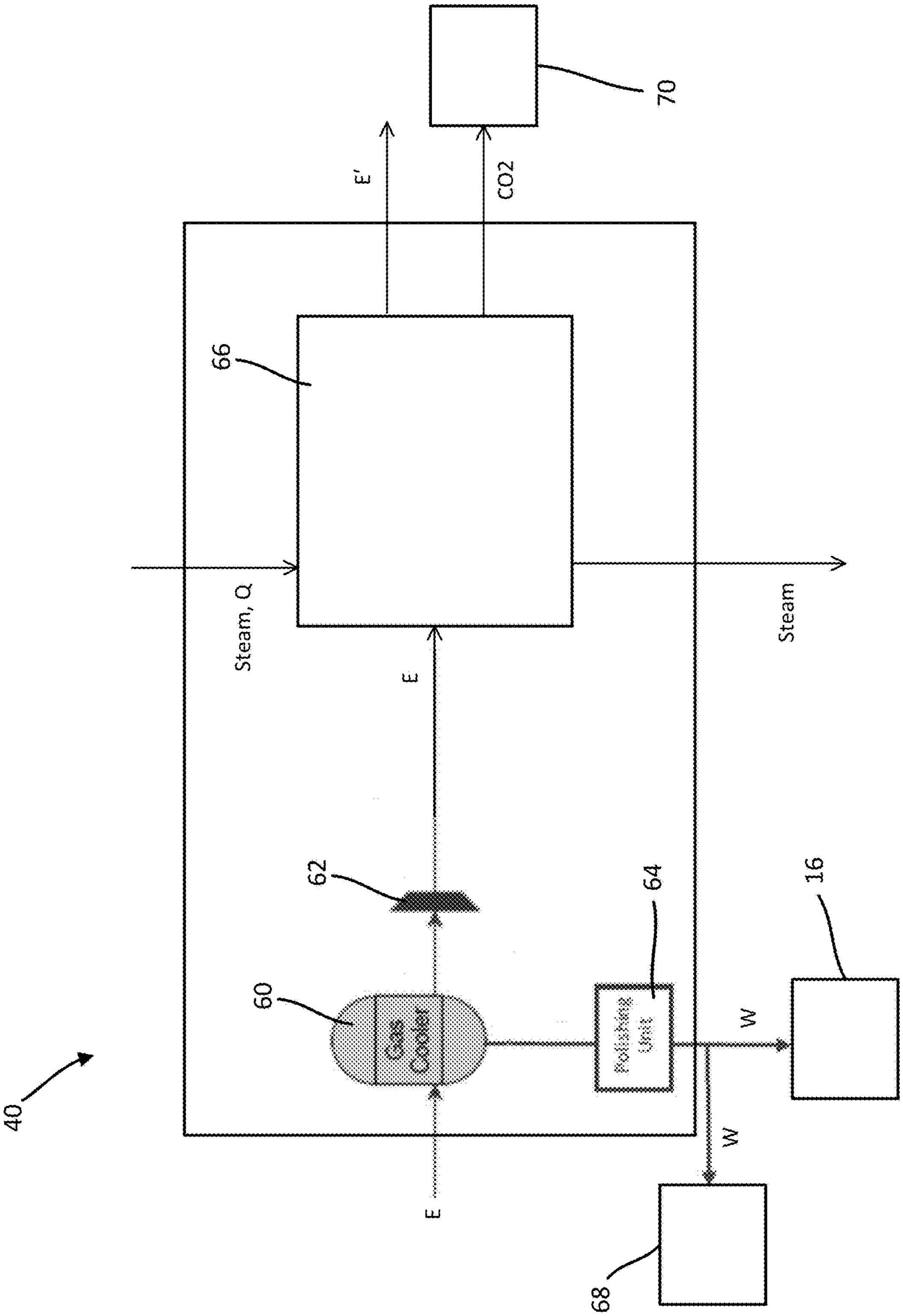
FIG. 2 is a schematic illustration of an emissions capture unit of the present disclosure comprising a gas cooler, a boost fan, a polishing unit and a MEA (monoethanolamine) unit.

FIG. 2 is a schematic illustration of capture unit 40 of FIG. 1, which can comprise gas cooler 60, boost fan 62, polishing unit 64 and MEA unit 66. In examples, capture unit 40 can be positioned to perform post-combustion capture, where CO2 is captured from exhaust gas E generated after combusting of a fuel. Before exhaust gas E engages with MEA unit 66 to perform the CO2 capture process, the exhaust gas is first passed through gas cooler 60.

Gas cooler 60 can comprise a direct contact cooler that is configured to directly engage exhaust gas E. Gas cooler 60 can be configured to cool exhaust gas E to temperatures suitable for use with MEA unit 66. In examples, exhaust gas E can be cooled to approximately thirty degrees Celsius (approximately eighty-six degrees Fahrenheit). Gas cooler 60 can condense water within exhaust gas E, including all water that results from steam injection and a portion of water that results from the combustion process. As such, gas cooler 60 can recover more water from exhaust gas E than is injected into combustor 24 from third line 46C. Gas cooler 60 can comprise a heat exchanger that receives a flow of a cooling medium, such as water, having a temperature that is colder than exhaust gas E. Water collected from gas cooler 60 can be directed into polishing unit 64.

Polishing unit 64 can be used to remove impurities from water condensed in gas cooler 60. For example, polishing unit 64 can remove minerals, such as calcium, magnesium, iron, and copper, from the water to prevent corrosion within HRSG 16 and GTE 12. Polishing unit 64 can utilize a bed of polymer resins through which the water flows to remove or exchange ions of harmful or potentially harmful minerals or contaminants from water.

Water collected from polishing unit 64 can be recycled to HRSG 16 and, as discussed herein, can be ultimately injected as steam into GTE 12. Additionally, any excess water collected by gas cooler 60 and by polishing unit 64 that is not needed for steam injection or that is leftover after steam injection can be extracted from power plant 10 for other uses. As mentioned, it can be possible for gas cooler 60 and polishing unit 64 to recover more water from exhaust gas E than is injected from third line 46C due to water vapor formed during the combustion process. As such, excess water can be used in other applications or can be discharged from power plant 10. In examples, excess water W can be directed to electrolyzer 68 to convert the water into hydrogen and oxygen. In examples, the hydrogen can be used as fuel for combustor 24. In examples, a plurality of electrolyzers can be used. In examples, steam injection through third line 46C can be shut-off, such as with a valve, and water recovered by gas cooler 60 can be used for other purposes. Water recovered without steam injection being performed is much less than when steam injection is being performed.

Boost fan 62 can be utilized to pressurize exhaust gas E after being cooled in gas cooler 60. Boost fan 62 can be connected to an electric motor that can be driven with power from electric generator 14 or another source. Power consumed by boost fan 62 can be relatively small compared to other system components. Boost fan 62 can elevate the pressure of exhaust gas E to facilitate proper passage through MEA unit 66.

In examples, as would be appreciated by one of skill in the art, capture unit 40 can comprise MEA unit 66. MEA unit 66 can utilize a monoethanolamine system utilizing an absorber and a stripper. Lean solvent, e.g., solvent free of CO2, in the absorber can be used to capture CO2 from exhaust gas E. Pressurization from boost fan 62 can be used to overcome pressure losses from the absorber. Thus, CO2 can be absorbed into the stripper within the absorber to form rich solvent. Rich solvent from the bottom of the absorber is pumped and preheated before entering the stripper. CO2 is released from the stripper with heat added through a reboiler to reconstitute the stripper. In examples, the heat can be provided by low-pressure steam from HRSG 16, as discussed herein. Thus, a reboiler can comprise a heat exchanger having low-pressure steam from HRSG 16, either directly or through a letdown station, as a first, relatively hot heat exchange fluid and rich solvent as a second, relatively cold heat exchange fluid. The lean solvent collected at the bottom of the stripper is then cooled and sent back to the absorber. CO2 removed from exhaust gas E can be stored in storage vessel 70. As mentioned, the CO2 can also be used for other purposes such as in oil recovery processes.

Examples of MEA units suitable for use as capture unit 40 are described in U.S. Pat. No. 4,857,283 to Madden, II titled "Use of Sulfur Dioxide for Corrosion Inhibition in Acid Gas Scrubbing Process" and U.S. Pat. No. 4,477,419 to Pearce et al. titled "Process for the Recovery of CO2 from Flue Gases," both of which are incorporated herein by this reference.

In examples, a KM-CDR Process™ can be used. Exhaust gas E containing CO2 can be cooled in an exhaust gas cooling tower, then exposed in an absorption tower to alkaline absorbent liquid, which absorbs the CO2 in the exhaust gas. Absorbent liquid containing a high concentration of CO2 is sent to the regeneration tower, where it is heated with steam to release the CO2 and regenerate the absorption liquid. The regenerated absorption liquid is returned to the absorption tower, where it is reused. This process can recover more than 90% of the CO2 contained in exhaust gas E and in some cases the CO2 can have a purity of more than 99.9% by volume.

Figure 3:
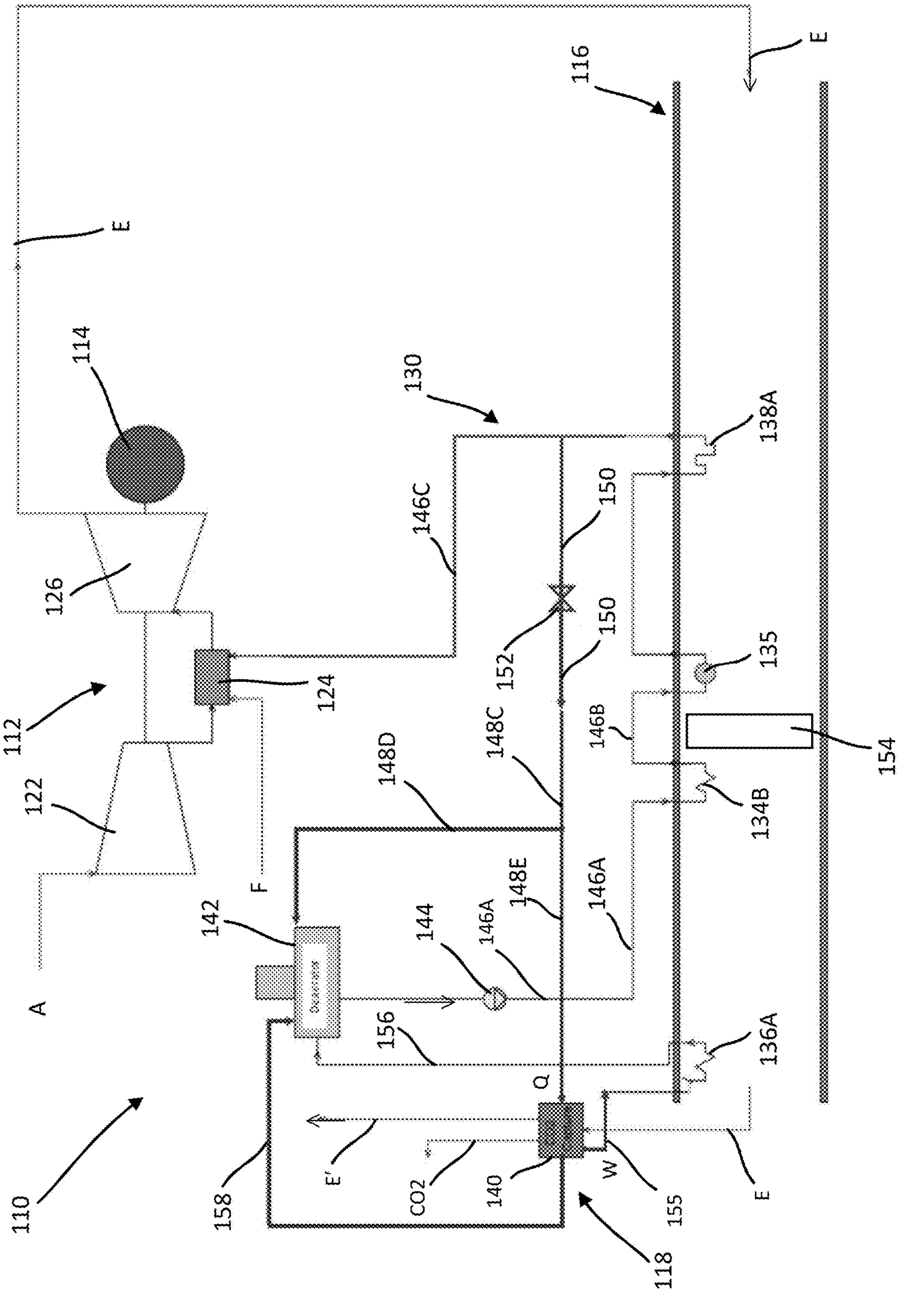
FIG. 3 is a schematic illustration of a gas turbine power plant comprising a gas turbine engine, a steam system and an emissions capture unit, wherein high-pressure steam from the steam system is used for steam injection in the gas turbine engine and a letdown station is used to produce low-pressure steam for the emissions capture unit.

FIG. 3 is a schematic illustration of power plant 110 comprising GTE 112, electric generator 114, HRSG 116 and emissions capture system 118 configured to use high-pressure steam for steam injection and a letdown station for emissions capture system 118. Power plant 110 can be configured similarly as power plant 10 of FIG. 1. As such reference numerals used in FIG. 1 are reused in FIG. 3 with the addition of a one-hundred-series modifiers. For example, GTE 12 can function similarly as GTE 112. Discussion of such reference numbers are omitted for brevity unless otherwise specifically discussed. However, power plant 110 of FIG. 3 differs from power plant 10 of FIG. 1 in that certain components can be omitted as compared to power plant 10. In particular, power plant 110 can omit all or portions of low-pressure circuit 32 so that HRSG 116 only includes high-pressure circuit 130. Furthermore, high-pressure circuit 130 includes HPE 134B, high-pressure evaporator 135 and superheater HPS 138A. LTE 136A can be retained to connect water flow of capture unit 140 to deaerator 142. As such, a single steam circuit can be provided that includes fluid line 155 connected to capture unit 140 and LTE 136A, line 156, deaerator 142, first line 146A, HPE 134B, second line 146B, high-pressure evaporator 135, superheater HPS 138A, third line 146C, letdown valve 152, letdown line 150, third line 148C, fourth line 148D and fifth line 148E.

In examples, letdown valve 152 can be opened when it is desirable to reduce or shut-off flow of steam injection to combustor 124 and can be closed when it is desirable to reduce or shut-off CO2 capture at capture unit 140. Letdown line 150 and letdown valve 152 can be included to allow a portion of high-pressure steam to be provided to capture unit 140 after being reduced in pressure and temperature. Letdown valve 152 can reduce pressure from high pressure to low pressure and, in examples, can comprised a pressure reducing valve. In examples, letdown valve 152 can additionally be used to introduce water, such as spray water from an external source, into letdown valve 152 leading into third line 148C to reduce the temperature of steam therein since capture unit 140 typically operates with steam at much lower temperatures than the temperatures at which steam injection is performed. Letdown valve 152 can be set at a fixed ratio or be controlled by an operator, or can vary depending on the operating state of HRSG 116 and other components. In examples, letdown valve 152 can be opened when it is desirable to reduce or shut-off flow of steam injection to combustor 124 and can be closed when it is desirable to reduce or shut-off CO2 capture based on high-pressure steam.

Power plant 10 of FIG. 1 can be configured such that sufficient high-pressure steam is generated for combustor 24 and sufficient low-pressure steam is generated for capture unit 40. Thus, the generation of each amount of steam can be matched for the particular need. Total steam production (high-pressure steam and low-pressure steam) of power plant 110 of FIG. 3 is less than power plant 10 of FIG. 1.

Power plant 110 of FIG. 3 can be configured such that either less high-pressure steam is generated for combustor 124 or less low-pressure steam is generated for capture unit 140. High-pressure circuit 30 of FIG. 1 can be designed based on either steam flow requirement or pinch limitation; Low-pressure circuit 32 of FIG. 1 is designed based on the pinch limitation. High-pressure circuit 130 of FIG. 3 is designed based on the pinch limitation. The design of pinch limitation gives the maximum steam flow of the circuit.

The configuration of FIG. 3 can perform similarly to the configuration of FIG. 1 without the use of a dedicated low-pressure circuit for providing low-pressure steam directly from HRSG 16 to capture unit 40. Steam from high-pressure circuit 130 can be provided directly to combustor 124 for steam injection and letdown line 150 for reducing in pressure and use with capture unit 140. Thus, in various configurations, power plant 110 can be less expensive than power plant 10 of FIG. 1 due to the inclusion of fewer components.

The advantages of power plant 10 and power plant 110 can be seen in a comparison to a conventional GTSC operating without CO2 capture. With reference to Table 1, Case A, Case B and Case C can be modeled using software. Case A can comprise a conventional existing gas turbine peaking plant using a dilution blower for a NOx catalyst, not utilizing steam injection and not using CO2 capture. Case B can comprise options one and two of FIG. 1 of the present disclosure, wherein high-pressure steam is extracted from HRSG 16 for use in combustor 24 and low-pressure steam is extracted from HRSG 16 for use with capture unit 40, with or without the use of a letdown station. Option one of FIG. 1 has high-pressure circuit 30 designed for satisfying steam flow required by injection to GTE 12; Option two of FIG. 1 has high-pressure circuit 30 designed based on the pinch limitation. Option one does not need the letdown valve 52 and letdown line 50 which has lower cost; Option two needs the letdown facilities to be installed which has operating flexibility. Case C can comprise option three of FIG. 3 of the present disclosure, wherein only high-pressure steam is extracted from HRSG 116, and a first portion of the high-pressure steam is provided to combustor 124 and a second portion of the high-pressure steam is provided to letdown line 150 for a reduction in pressure before being provided to capture unit 140.

Examples of parameters for operating GTSC power plants for Cases A, B and C were modeled based on assumptions of the efficiency and losses. In the example modeled GTSC power plants, the gas turbine engines were modeled as 170 MW-230 MW range power plants and steam injection was modeled at 12% steam-to-air ratio. Modeling also involved the use of deaerator mass and heat balances. The simulations were based on ISO ambient conditions: 1.013 bar, dry bulb temperature of 15° C., and relative humidity of 60%. Simulations for cases A, B and C are summarized in Table 1.

Additional modeling parameters include:

Plant auxiliary load ratio for existing GT peaker (with dilution blower for hot SCR)/proposed steam-injection GTSC (blower not needed for SCR) is 2%/1%, respectively.

HP steam parameters are 216 t/h (metric tons per hour), 30 bar, and 540° C.

Basis of CO2 capture unit: a) CO2 removal efficiency is 95%/73% for Options 1 & 2/Option 3, respectively; b) LP steam requirement is 1.38 (ratio of steam flow to CO2-captured flow) at 5 bar saturated; and c) Auxiliary load is 85 kWh/(1000 lb-CO2 captured).

TABLE 1

Performance Data of Power Plant for Cases A, B and C

| Cases | | (A) GTE Peaker w/ Dilution Blower and no Steam Injection | (B) New Concept Options 1 and 2 HP and LP Steam with Letdown | (C) New Concept Option 3 HP Steam with Letdown |
|---|---|---|---|---|
| Number of GTEs in Operation | n/a | 1 | 1 | 1 |
| GTE Heat Input, LHV | MWth | 554.9 | 699.3 | 699.3 |
| GTE Output | MW | 209.7 | 364.7 | 364.7 |
| Plant Aux. Load (CO2 Capture excepted) | MW | 4.2 | 3.6 | 3.6 |
| Aux. Load of CO2 Capture | MW | — | 24.7 | 18.9 |
| Total Plant Aux. Load | MW | 4.2 | 28.3 | 22.5 |
| Net Plant Output | MW | 205.5 | 336.3 | 342.1 |
| Δ Net Plant Output | MW | — | ***130.8*** | ***136.5*** |
| Net Power Efficiency, LHV | | 37.0% | 48.1% | 48.9% |
| Δ New Power Efficiency, LHV | | — | ***11.1%*** | ***11.9%*** |
| Water Recovered | t/h | — | 294 | 294 |
| Water Injection to GTE | t/h | — | 216 | 216 |
| Water Byproduct | t/h | — | ***78*** | ***78*** |
| $CO_2$ captured | t/h | — | ***132*** | ***101*** |

As presented in Table 1, highlighted cells (with double line borders and grey with italic text) indicate the performance improvement of power plant 10 and power plant 110. Compared to Case A (current state of the art), Case B and Case C have much better performance: output increased by 130.8 MW or 136.5 MW, and efficiency higher by 11.1% points and 11.9% respectively. Furthermore, Case B and Case C include capture of 132 t/h and 101 t/h of CO2 captured.

Figure 4:
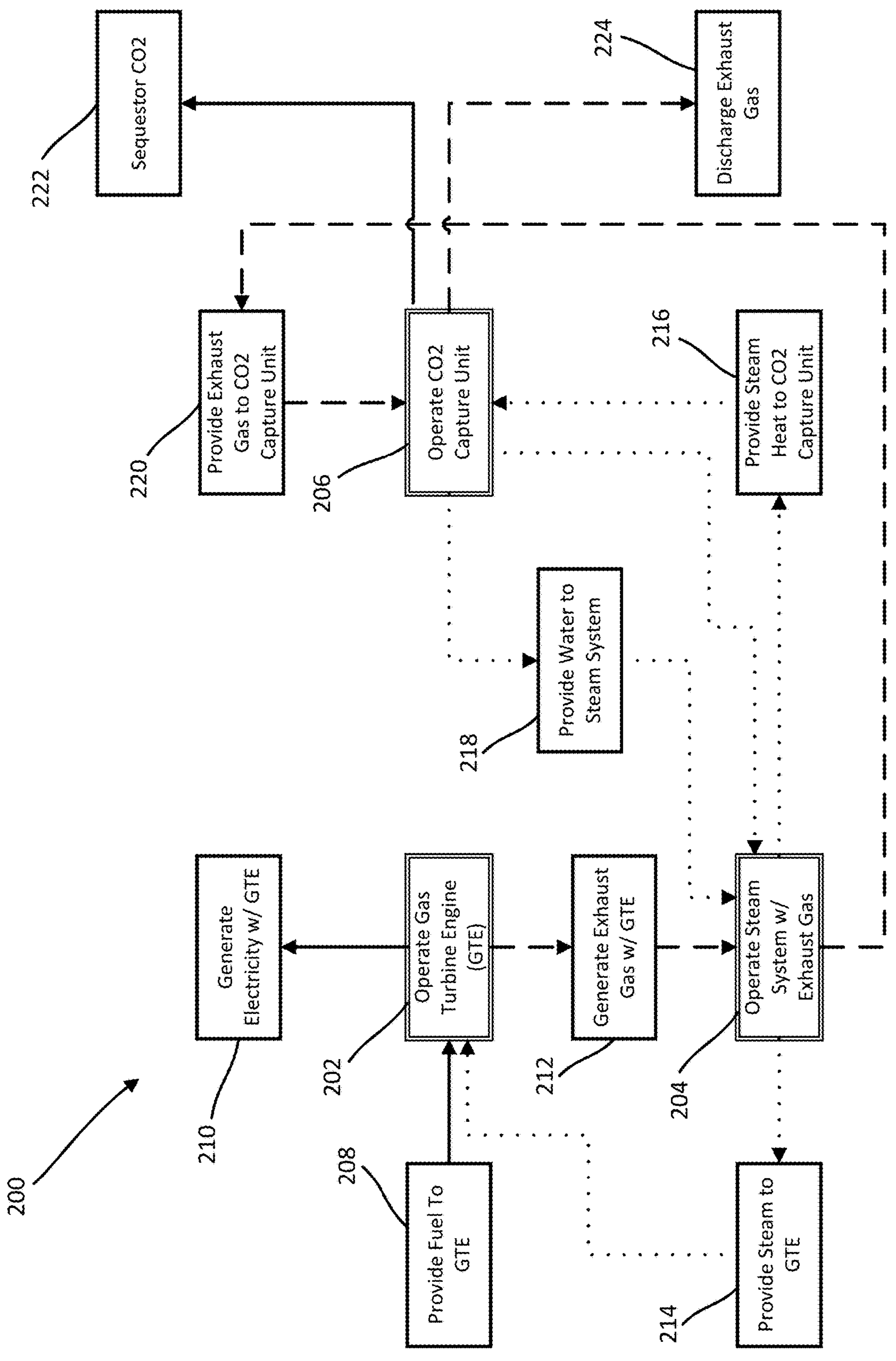
FIG. 4 is a schematic line diagram illustrating methods for operating power plants using a gas turbine engine, a steam system and an emissions capture unit, wherein water collected from the emissions capture unit can be sent to the steam system to generate steam for the gas turbine engine and the emissions capture unit.

FIG. 4 is a line diagram illustrating steps of method 200 for operation of power plant 10, which can incorporate GTE 12, electric generator 14, HRSG 16 and emissions capture system 18, as shown in FIG. 1 and FIG. 2. Method 200 can additionally be representative of the operation of other combined cycle power plants configured similarly to or different than power plant 10, such as power plant 110 of FIG. 3. Method 200 can comprise three main operations, e.g., operation 202, operation 204 and operation 206, that can operate simultaneously, or sequentially in various orders as needed for start-up and shut down, maintenance or partial operation. Method 200 is illustrated as having operation 202 through operation 224, however, a greater or fewer number of operations can be performed. Additionally, operation 202 through operation 224 can be performed in other sequences or arrangements than what is illustrated and described.

FIG. 4 utilizes dashed lines to show exhaust gas operations, dotted lines to show steam and/or water operation, and solid lines for fuel, mechanical, electrical or other operations for visualization purposes. However, all lines are intended to indicate movements between operations of method 200, and exhaust, water, steam, electrical, mechanical and other operations can occur at any or all operations.

At operation 202, GTE 12 can be operated. Air A and fuel F can be provided to combustor 24 to be burned and produce exhaust gas E. A single gas turbine engine is illustrated in FIG. 1, but more than one of GTE 12 can be used. In examples, fuel F can comprise hydrogen from an electrolyzer, and steam is injected from HRSG 16.

At operation 204, a steam system, such as HRSG 16, can be operated. The steam system can include one or more stages, such as a low-pressure circuit and a high-pressure circuit. In examples, the steam system can comprise only one stage, such as a high-pressure circuit. The steam system can also include a letdown station to convert high-pressure steam to low-pressure steam.

At operation 206, capture unit 40 can be operated. As discussed, capture unit 40 can comprise a post-combustion MEA unit. A single emissions capture unit is illustrated in FIG. 1, but more than one of capture unit 40 can be used. Capture unit 40 can be operated to remove CO2 from exhaust gas E using a heat input provided by the steam system. Other types of captures units can be used than MEA units.

At step 208, fuel F can be provided to GTE 12. In examples, the fuel can comprise 100% natural gas. In examples, the fuel can comprise about 50% to about 70% natural gas, with the balance comprising hydrogen (H2). In examples, some or all of fuel F can be H2, as may be provided from an electrolyzer, such an electrolyzer operating with water provided by capture unit 40.

At operation 210, operation of GTE 12 can be used to generate rotational shaft power that can be used to drive an electrical generator to generate electricity for providing to a power grid. For example, electric generator 14 can be operated to provide electrical power to a grid system.

At operation 212, exhaust gas E from GTE 12 can be provided to the steam system of operation 204. Exhaust gas E can be routed along various heat exchangers, such as economizers, evaporators, and superheating stages of low-pressure and high-pressure steam circuits. Exhaust gas E can provide heat to convert water within HRSG 16 to steam at one or more pressures. Additionally, exhaust gas E can be passed through catalysts beds of one or both of NOx and CO emissions reductions panels within catalyst 54 located with HRSG 16.

At operation 214, steam from the steam system can be provided to GTE 12. In particular, steam can be injected into combustor 24 to increase the mass of gas flowing to turbine 26. In examples, high-pressure steam from HRSG 16 can be provided to combustor 24. In examples, steam can be mixed with compressed air from compressor 22 in a ratio of 12% steam-to-air.

At operation 216, steam from the steam system can be provided to capture unit 40 at operation 206 to provide heat Q to capture unit 40. In examples, low-pressure steam can be provided from HRSG 16 to MEA unit 66. In examples, high-pressure steam from HRSG 16 can be passed through a letdown station before being provided to MEA unit 66. The steam can be provided via a heat exchange coil or via a heating jacket configured to transfer heat from the steam to MEA unit 66. The steam passes through MEA unit 66 after providing the heat input before being returned to the steam system at operation 218.

At operation 218, recycled water of the operation of capture unit 40 can be provided to the steam system, e.g., HRSG 16. A gas cooler of capture unit 40 can be used to condense water vapor within exhaust gas E before the exhaust gas interacts with a CO2 capture unit. Recovered water of capture unit 40 can be passed through a polishing unit, such as polishing unit 64, to remove minerals, such as magnesium and iron, and a deaerator, such as deaerator 42, to remove gases from the water, such as oxygen and carbon dioxide.

At operation 220, exhaust gas E from GTE 12 can be provided to capture unit 40. Exhaust gas E can pass from turbine 26, flow through HRSG 16 to produce steam, and then into capture unit 40. Capture unit 40 can remove CO2 from exhaust gas E to produce exhaust gas E' that is free or substantially free of CO2. Exhaust gas E' can be passed into the atmosphere.

At operation 222, CO2 removed from exhaust gas E can be sequestered. For example, CO2 can be partially or completely removed from exhaust gas E via a MEA process described herein. Other emissions capture technologies can be used, and other types of emissions can be captured. CO2 removed at operation 206 can be stored in a storage container or vessel, such as storage vessel 70. Thus, the stored CO2 can be properly disposed of without being released to the atmosphere. In additional examples, the CO2 can be used for other processes such as refrigeration and cooling cycles or in oil recovery processes.

At operation 224, cleaned exhaust gas E' can be vented to the atmosphere.

The present disclosure provides multiple benefits for gas turbine peaking power plants with integrated CO2 capture systems over conventional gas turbine simple cycle peaker plants, such as those operating without CO2 capture and with dilution blowers for SCR operation.

Environmental Impact: The integration of steam injection and CO2 capture systems in a GTSC power plant offers a mutually beneficial arrangement that enhances gas turbine performance and reduces environmental impact. For example, gas turbine peaking power plants of the present disclosure can incorporate CO2 capture units to reduced greenhouse gas emissions and NOx reduction catalyst system to reduce emission of other pollutants.

$CO_2$ Capture: The gas turbine peaking power plants of the present disclosure capture $CO_2$ from the flue gas, which can significantly improve the economics of a project, especially if carbon tax credits and other incentives are applied. Conventional peaker plants do not utilize $CO_2$ capture due to the penalty incurred from needing heat input for the $CO_2$ capture units.

Economic and Regulatory Advantages: The ability of the gas turbine peaking power plants of the present disclosure to capture $CO_2$ could improve the economy of a power production facility, particularly in regulatory environments that incentivize low emissions and carbon capture.

Water Recovery: The gas turbine peaking power plants of the present disclosure can condense and recover water vapor from flue gas, which can then be used for steam injection into the gas turbine combustor, enhancing efficiency and conserving water resources. Conventional peaker plants do not typically utilize water recovery systems.

Use of Byproduct Water: Byproduct water/excess water from the $CO_2$ capture process can be used for other purposes including water input to electrolyzer or cooling system makeup, reducing the need for fresh water and minimizing the environmental footprint of the plant.

Enhanced Gas Turbine Performance: The gas turbine peaking power plants of the present disclosure allow for the enhancement of gas turbine performance by using steam injection to increase the mass of generated high-energy gas, which in turn increases the capability of driving the turbine.

Power Plant Performance Improvement: The gas turbine peaking power plants of the present disclosure improve the output and heat rate of peaking power plants due to the integration of steam injection into the gas turbine simple cycle (GTSC) with post-combustion $CO_2$ capture.

Elimination of Dilution Blower: The gas turbine peaking power plants of the present disclosure do not need a dilution blower to incorporate emissions reduction catalysts, thereby reducing capital equipment costs and auxiliary load requirements. Conventional peaker plants require a dilution blower to incorporate emissions reduction catalysts, which can still be utilized in the gas turbine peaking power plants without a dilution blower due to the steam system.

Heat and Electrical Penalties Reduction: The gas turbine peaking power plants of the present disclosure mitigate the electrical penalty typically associated with operating dilution blowers and the heat penalty for operating $CO_2$ capture units, thus improving overall plant efficiency.

Operational Flexibility: The gas turbine peaking power plants of the present disclosure provide operational flexibility, such as fast start-up, which is important for peaking power plants that need to respond quickly to fluctuations in electricity demand.

VARIOUS NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A power production facility comprising:

a gas turbine engine configured to combust a fuel in a combustion process to produce exhaust gas that can be used to produce rotational shaft power for generating electricity;

a steam system configured to produce steam from water with heat from the exhaust gas for injection into the combustion process, wherein the steam system comprises:

a low-pressure stage and a high-pressure stage;

a high-pressure steam line connecting the high-pressure stage of the steam system to the gas turbine engine;

a first low-pressure steam line connected to the low-pressure stage;

a letdown line connecting the high-pressure steam line to the first low-pressure steam line, wherein the letdown line is configured to divert a portion of steam from the high-pressure steam line to the first low-pressure steam line; and a pressure and temperature control element in the letdown line to reduce a pressure and temperature of the steam, wherein the pressure and temperature control element is configured to vary an amount of steam diverted from the high-pressure steam line to the first low-pressure steam line;

an emissions capture system configured to:

receive the exhaust gas to remove pollutants;

receive at least some of the steam from the steam system via the first low-pressure steam line and the diverted portion of steam from the high-pressure steam line to provide heat to the emissions capture system; and provide at least some of the water to the steam system;

a deaerator configured to receive the water from the steam system and emissions capture system;

a second low-pressure steam line connecting the first low-pressure steam line and the deaerator to provide low-pressure steam to the deaerator; and a water inlet on the pressure and temperature control element configured to introduce water into the letdown line to reduce a temperature of steam passing through the letdown line before entering the first low-pressure steam line.

2. The power production facility of claim 1, wherein the emissions capture system comprises a CO2 capture unit that removes CO2 from the exhaust gas.

3. The power production facility of claim 2, wherein the CO2 capture unit comprises a monoethanolamine gas treating unit.

4. The power production facility of claim 1, wherein the emissions capture system comprises a gas cooler configured to receive the exhaust gas, the gas cooler configured to condense the steam within the exhaust gas.

5. The power production facility of claim 4, further comprising a water extraction line to send at least a portion of the water condensed by the gas cooler to an external consumer of the water, wherein the external consumer of water comprises an electrolyzer.

6. The power production facility of claim 1, wherein the low-pressure stage and the high-pressure stage of the steam system comprise a 2-pressure stage heat recovery steam generator.

7. The power production facility of claim 1, further comprising a pump to provide the water from the deaerator to the steam system.

8. The power production facility of claim 1, wherein the low-pressure stage and the high-pressure stage of the steam system comprise at least a portion of a heat recovery steam generator having two or more stages.

9. A method of removing emissions from a power plant, the method comprising:

generating an exhaust stream with a gas turbine engine configured to combust a fuel in a combustor for producing the exhaust stream in a combustion process, the exhaust stream configured to generate rotational shaft power for generating electricity;

generating a steam supply in a steam system from a water supply with heat from the exhaust stream, the steam system comprising a low-pressure stage and a high-pressure stage;

injecting high-pressure steam from the high-pressure stage of the steam supply into a combustor of the gas turbine engine through a high-pressure steam line;

heating an emissions capture unit with low-pressure steam from a first low-pressure steam line connected to the low-pressure stage of the steam supply;

diverting a portion of the high-pressure steam to be injected into the combustor toward the emissions capture unit;

diverting a portion of steam from the high-pressure steam line to the first low-pressure steam line via a letdown line connecting the high-pressure steam line to the first low-pressure steam line;

reducing a pressure and a temperature of the portion of the high-pressure steam to be injected into the combustor before entering the emissions capture unit via a pressure and temperature control element in the letdown line, wherein the pressure and temperature control element is configured to vary an amount of steam diverted from the high-pressure steam line to the first low-pressure steam line;

removing emissions from the exhaust stream with the emissions capture unit;

collecting water from the emissions capture unit;

providing the water from the emissions capture unit to the steam supply;

deaerating water from the steam system and the emissions capture unit with a deaerator before providing the water to the steam supply;

providing low-pressure steam to the deaerator via a second low-pressure steam line connecting the first low-pressure steam line and the deaerator; and introducing water into the letdown line via a water inlet on the pressure and temperature control element to reduce a temperature of steam passing through the letdown line before entering the first low-pressure steam line.

10. The method of claim 9, further comprising:

controlling an amount of the high-pressure steam provided to the emissions capture unit to control emissions capture capacity.

11. The method of claim 9, further comprising:

operating the gas turbine engine of the power plant in simple cycle; and generating electricity with the gas turbine engine.

* * * * *